United States Patent
Singh

(10) Patent No.: US 12,081,970 B2
(45) Date of Patent: Sep. 3, 2024

(54) CONTEXTUAL AUTHENTICATION FOR SECURE REMOTE SESSIONS

(71) Applicant: Citrix Systems, Inc., Ft. Lauderdale, FL (US)

(72) Inventor: Manbinder Pal Singh, Coral Springs, FL (US)

(73) Assignee: Citrix Systems, Inc., Ft. Lauderdale, FL (US)

(*) Notice: Subject to any disclaimer, the term of this patent is extended or adjusted under 35 U.S.C. 154(b) by 127 days.

(21) Appl. No.: 17/660,695

(22) Filed: Apr. 26, 2022

(65) Prior Publication Data

US 2023/0345240 A1   Oct. 26, 2023

(51) Int. Cl.
| | | |
|---|---|---|
| H04L 29/06 | (2006.01) | |
| H04W 4/80 | (2018.01) | |
| H04W 12/0431 | (2021.01) | |
| H04W 12/06 | (2021.01) | |

(52) U.S. Cl.
CPC ......... *H04W 12/0431* (2021.01); *H04W 4/80* (2018.02); *H04W 12/068* (2021.01)

(58) Field of Classification Search
CPC .. H04W 12/0431; H04W 4/80; H04W 12/068
See application file for complete search history.

(56) References Cited

U.S. PATENT DOCUMENTS

| | | | | |
|---|---|---|---|---|
| 2013/0152178 A1* | 6/2013 | King | ............ | H04W 12/06 726/6 |
| 2015/0379255 A1* | 12/2015 | Konanur | ............ | H04W 12/33 726/19 |
| 2016/0005032 A1* | 1/2016 | Yau | ............ | G06Q 20/3674 705/69 |
| 2017/0086069 A1* | 3/2017 | Liu | ............ | H04L 9/3213 |
| 2017/0180137 A1* | 6/2017 | Spanier | ............ | G06F 8/65 |

OTHER PUBLICATIONS

"Context aware authentication" An IP.com Prior Art Database Technical Disclosure Authors et. al.: Disclosed Without Attribution IP.com No. IPCOM000225061D (Year: 2013).*

* cited by examiner

*Primary Examiner* — Ka Shan Choy

(57) ABSTRACT

A contextual authentication method includes receiving a request to launch a web service and causing the web service to be launched on a remote browser. When a security event is detected, a security key obtained, based on a context of a client computing system, from a near-field communication (NFC) device connected to a mobile device. The security key is requested and received from the NFC device via the mobile device. The security key is delivered to the web service via the remote browser.

20 Claims, 5 Drawing Sheets

CONTEXTUAL AUTHENTICATION FOR SECURE REMOTE SESSIONS

BACKGROUND

Multi-factor authentication (MFA) is a technique for verifying the identity of a user using two or more security factors. MFA can be used as a mechanism for gaining access to a resource, such as a file, an application, an account, or a network, and to reduce the risk that such resources can be accessed or compromised by a malicious attacker. For example, a security key is a physical device that can be used in addition to a password—that is, to provide an additional security factor—to authenticate the holder of the key. The key is typically in the possession of the authorized user, so that it is not possible for someone without the key to obtain access to the protected resource. In some cases, the key is physically attached to a computing device, such as via a Universal Serial Bus (USB) port, while the device reads data from the key. If a physical connection is not possible, the ability to use the key is restricted or not possible. Therefore, non-trivial issues remain with respect to the use of certain MFA technologies.

SUMMARY

One example provides a method of contextual authentication for secure remote sessions. The method includes receiving, by a processor and from a remote browser associated with a client computing system, a request to launch a web service; causing, by the processor, the web service to be launched on the remote browser; detecting, by the processor and from the web service, a security event; in response to detecting the security event, determining, by the processor, that a security key is to be obtained from a near-field communication (NFC) device connected to a mobile device based on a context of the client computing system; requesting, by the processor, the security key from the NFC device via the mobile device; receiving, by the processor, the security key from the NFC device via the mobile device; and delivering, by the processor, the security key to the web service via the remote browser. In some examples, the method includes determining, by the processor, the context of the client computing system based on a proximity of the mobile device to the client computing system. In some examples, the method includes determining, by the processor, the context of the client computing system based on an availability of at least one physical data port. In some examples, the method includes executing, by a processor of a remote machine, a virtual delivery agent that executes remotely from the client computing system, wherein the remote browser is configured to participate in a virtual session through the virtual delivery agent. In some examples, the security key is received from the NFC device via a peer-to-peer connection between the mobile device and the client computing system, or the security key is received from the mobile device by the remote browser via a virtual backend system. In some examples, the the mobile device includes an NFC module configured to receive the security key wirelessly from the NFC device. In some examples, the mobile device includes an NFC module configured to receive the security key from the NFC device.

Another example provides a computer program product including one or more non-transitory machine-readable mediums having instructions encoded thereon that when executed by at least one processor cause a process to be carried out. The process includes receiving, from a remote browser associated with a client computing system, a request to launch a web service; causing the web service to be launched on the remote browser; detecting, from the web service, a security event; in response to detecting the security event, determining that a security key is to be obtained from a near-field communication (NFC) device connected to a mobile device based on a context of the client computing system; requesting the security key from the NFC device via the mobile device; receiving the security key from the NFC device via the mobile device; and delivering the security key to the web service via the remote browser. In some examples, the process includes determining the context of the client computing system based on a proximity of the mobile device to the client computing system. In some examples, the process includes determining the context of the client computing system based on an availability of at least one physical data port. In some examples, the process includes executing, by a processor of a remote machine, a virtual delivery agent that executes remotely from the client computing system, wherein the remote browser is configured to participate in a virtual session through the virtual delivery agent. In some examples, the security key is received from the NFC device via a peer-to-peer connection between the mobile device and the client computing system, or the security key is received from the mobile device by the remote browser via a virtual backend system. In some examples, the mobile device includes an NFC module configured to receive the security key wirelessly from the NFC device. In some examples, the mobile device includes an NFC module configured to receive the security key from the NFC device.

Yet another example provides a system including a storage and at least one processor operatively coupled to the storage. The at least one processor is configured to execute instructions stored in the storage that when executed cause the at least one processor to carry out a process. The process includes receiving, from a remote browser associated with a client computing system, a request to launch a web service; causing the web service to be launched on the remote browser; detecting, from the web service, a security event; in response to detecting the security event, determining that a security key is to be obtained from a near-field communication (NFC) device connected to a mobile device based on a context of the client computing system; requesting the security key from the NFC device via the mobile device; receiving the security key from the NFC device via the mobile device; and delivering the security key to the web service via the remote browser. In some examples, the process includes determining the context of the client computing system based on a proximity of the mobile device to the client computing system, determining the context of the client computing system based on an availability of at least one physical data port, or both. In some examples, the process includes executing, by a processor of a remote machine, a virtual delivery agent that executes remotely from the client computing system, wherein the remote browser is configured to participate in a virtual session through the virtual delivery agent. In some examples, the security key is received from the NFC device via a peer-to-peer connection between the mobile device and the client computing system, or the security key is received from the mobile device by the remote browser via a virtual backend system. In some examples, the mobile device includes an NFC module configured to receive the security key wirelessly from the NFC device. In some examples, the mobile device includes an NFC module configured to receive the security key from the NFC device.

Other aspects, examples, and advantages of these aspects and examples, are discussed in detail below. It will be understood that the foregoing information and the following detailed description are merely illustrative examples of various aspects and features and are intended to provide an overview or framework for understanding the nature and character of the claimed aspects and examples. Any example or feature disclosed herein can be combined with any other example or feature. References to different examples are not necessarily mutually exclusive and are intended to indicate that a particular feature, structure, or characteristic described in connection with the example can be included in at least one example. Thus, terms like "other" and "another" when referring to the examples described herein are not intended to communicate any sort of exclusivity or grouping of features but rather are included to promote readability.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this specification but are not intended as a definition of the limits of any particular example. The drawings, together with the remainder of the specification, serve to explain principles and operations of the described and claimed aspects. In the figures, each identical or nearly identical component that is illustrated in various figures is represented by a like numeral. For purposes of clarity, not every component may be labeled in every figure.

DETAILED DESCRIPTION

Overview

Figure 1:
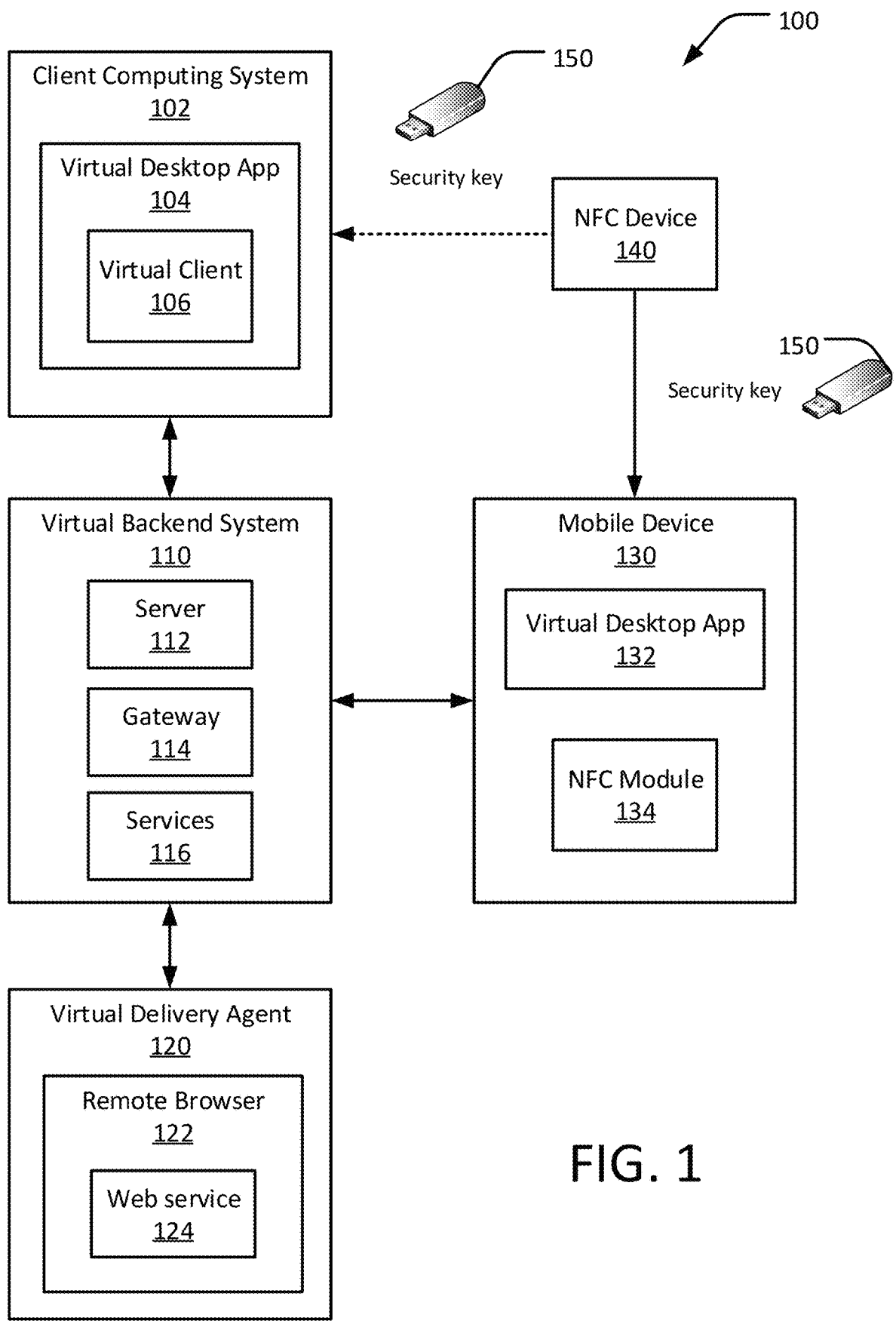
FIG. 1 is a block diagram of a system for contextual authentication using near-field communications (NFC), in accordance with an example of the present disclosure.

As noted above, a security key is a type of MFA. YubiKey®, manufactured by Yubico of Palo Alto, California, is a security key that supports certain types of MFA, such as one-time passwords. Certain security keys utilize near-field communication (NFC), which enables a device with the security key to wirelessly transmit one-time passwords or other data to NFC readers on other devices. Certain security keys have Universal Serial Bus (USB) interfaces, and yet other security keys have both NFC and USB capabilities. In some cases, a USB device can include circuitry or logic for generating a security key. The USB device can be inserted into, and read from, the USB port (or other physical data port) of a computer or using an NFC reader if the USB device is NFC-capable.

In some use cases, a user may be using a client computing device that does not have an NFC reader, such as a desktop or laptop computer, as well as a mobile device that includes an NFC reader, such as a smartphone. In some scenarios, the user may attempt to access a protected resource that requires a security key, such as a website executing on a remote session of the client computing device (e.g., a virtual machine). Because the client computing device has no NFC reader, it is not possible for the user to provide the security key to the resource via NFC on the client computing device, and thus a different communication channel must be established for sending the security key to the resource.

For example, if the client computing device has a USB port, and the security key has USB capability, the user can insert the security key into the USB port of the client computing device. In another example, if the client computing device has both a USB port and an NFC reader, then the security key can be used in either modality. For instance, the security key can be inserted into the USB port if the port is available or the user can utilize the NFC reader of the mobile device if the USB port is in use by another USB device. However, if the client computing device does not have an NFC reader, then the user will have to remove any USB device from the USB port before inserting the security key into the USB port.

To this end, techniques for contextual authentication using near-field communication for secure remote sessions are provided. A remote session is one in which an application executes on a different physical or virtual machine (VM) from the client machine that is local to the user (e.g., Microsoft Windows® VM, Linux VM, software-as-a-service (SaaS), web-based email or word processing services, etc.). When a security key (e.g., YubiKey®) is needed to authenticate a remote session executing on a client computing device (e.g., a browser within a virtual machine), the context of the client computing device is determined. For example, the context of the client computing device can be that the client computing device has no USB port, or no unused USB port, and that an NFC-capable mobile device is in proximity of the client computing device. In such a context, the remote session initiates a mobile application on the mobile device, which receives the NFC security key on the mobile device and transfers the key to the remote session. In this manner, the NFC security key can be accessed from the mobile device by the remote session, based on the context of the client computing device.

Contextual Authentication System

FIG. 1 is a block diagram of a system 100 for contextual authentication using NFC, in accordance with an example of the present disclosure. The system 100 includes a client computing system 102, a virtual backend system 110, a virtual delivery agent 120, a mobile device 130, and an NFC device 140. The client computing system 102, the virtual backend system 110, the virtual delivery agent 120, and the mobile device 130 can each be in communication with other components of the system 100 using, for example, a local area network, a wide area network, or any type of wired or wireless network. In some examples, the NFC device 140 is incorporated into a USB device (e.g., USB-A or USB-C compatible device) that can be accessed using a USB connection, or incorporated into another type of device using a proprietary connection, such as a Lightning connector by Apple Inc., of Cupertino, Calif. Additionally, the NFC device 140 includes NFC technology for near-field communication with any NFC-capable receiver, including the NFC module 134 of the mobile device 130. The NFC device 140 is configured to generate and provide or otherwise transmit a security key 150 (e.g., YubiKey®) to the client computing system 102 and/or the mobile device 130. In some examples, the security key 150 is generated by a separate hardware device (e.g., a USB device, a serial port dongle, a smart card, etc.), as opposed to a software-generated security key, such as found in some existing authentication applications designed for execution on general purpose computing systems and mobile devices.

The client computing system 102 is configured to execute a virtual desktop app 104, within which one or more virtual client sessions 106 can be instantiated. For example, the virtual client session 106 can be implemented within a variety of computing resources including a virtualization infrastructure (e.g., a virtual machine), such as the HDX™ virtualization infrastructure commercially available from Citrix Systems of Fort Lauderdale, Fla. The virtual desktop app 104 can be implemented using, for example, the Citrix Workspace™ application; a browser embedded within the virtual desktop app 104; a secure browser service, such as the Citrix Secure Browser™ service; the virtual delivery agent 120, and/or other computing resources.

The virtual backend system 110 includes one or more servers 112, one or more gateways 114, and one or more service 116. In some examples, the virtual backend system 110 is an extension of the virtualization infrastructure discussed above. For instance, the virtual backend system 110 is configured to interact with the virtual desktop app 104 and provide services to support the virtual client 106 on the client computing system 102. In some examples, the server 112 can provide operational support for the services 116, and the gateway 114 can provide communications support between the services 116 and the virtual client 106. The services 116 can include any type of services for supporting the virtualization infrastructure, such as user authentication, data management, remote updating, notifications, storage, and application hosting. Additionally, the virtual backend system 110 provides or otherwise interacts with the virtual delivery agent 120. For example, the virtual backend system 110 can create the virtual delivery agent 120 for executing a remote browser 122 via the virtual client 106 of the client computing system 102 (e.g., a desktop application executing remotely from the client computing system 102). As will be discussed in further detail with respect to FIG. 3, the virtual backend system 110 is configured to provide at least a portion of a contextual authentication process for MFA of a web service 124 executing within a remote browser 122 of the virtual delivery agent 120. A web service 124 can include any service that is provided to the client computing system 102 remotely, such as web-based email, web-based word processing, or other web-based services.

The mobile device 130 can include any mobile computing device, such as a smartphone, a laptop computer, a tablet computer, or a thin client computer. Generally, the mobile device 130 is battery powered for portability, but can nevertheless include devices that are not battery powered, such as small form factor desktop personal computers. The mobile device 130 is configured to execute a virtual desktop app 132 and includes an NFC module 134. The virtual desktop app 132 can be implemented using, for example, the Citrix Workspace™ application; a browser embedded within the virtual desktop app 132; a secure browser service, such as the Citrix Secure Browser™ service; the virtual delivery agent 120, and/or other computing resources. In this sense, the mobile device 130 and the client computing system 102 are both capable of providing virtualized services (e.g., a virtual machine), such as the web service 124 within the remote browser 122. The NFC module 134 includes hardware, firmware, and software configured to send and receive wireless signals, including the security key 150, to and from the NFC device 140 (e.g., YubiKey®). In some examples, the mobile device 130 is NFC-capable while the client computing system 102 is not NFC-capable (that is, the client computing system 102 cannot directly communicate with the NFC device 140). In some other examples, both the mobile device 130 and the client computing system are NFC-capable (e.g., the client computing system 102 includes an NFC module (not shown) that is similar to the NFC module 134).

Figure 2:
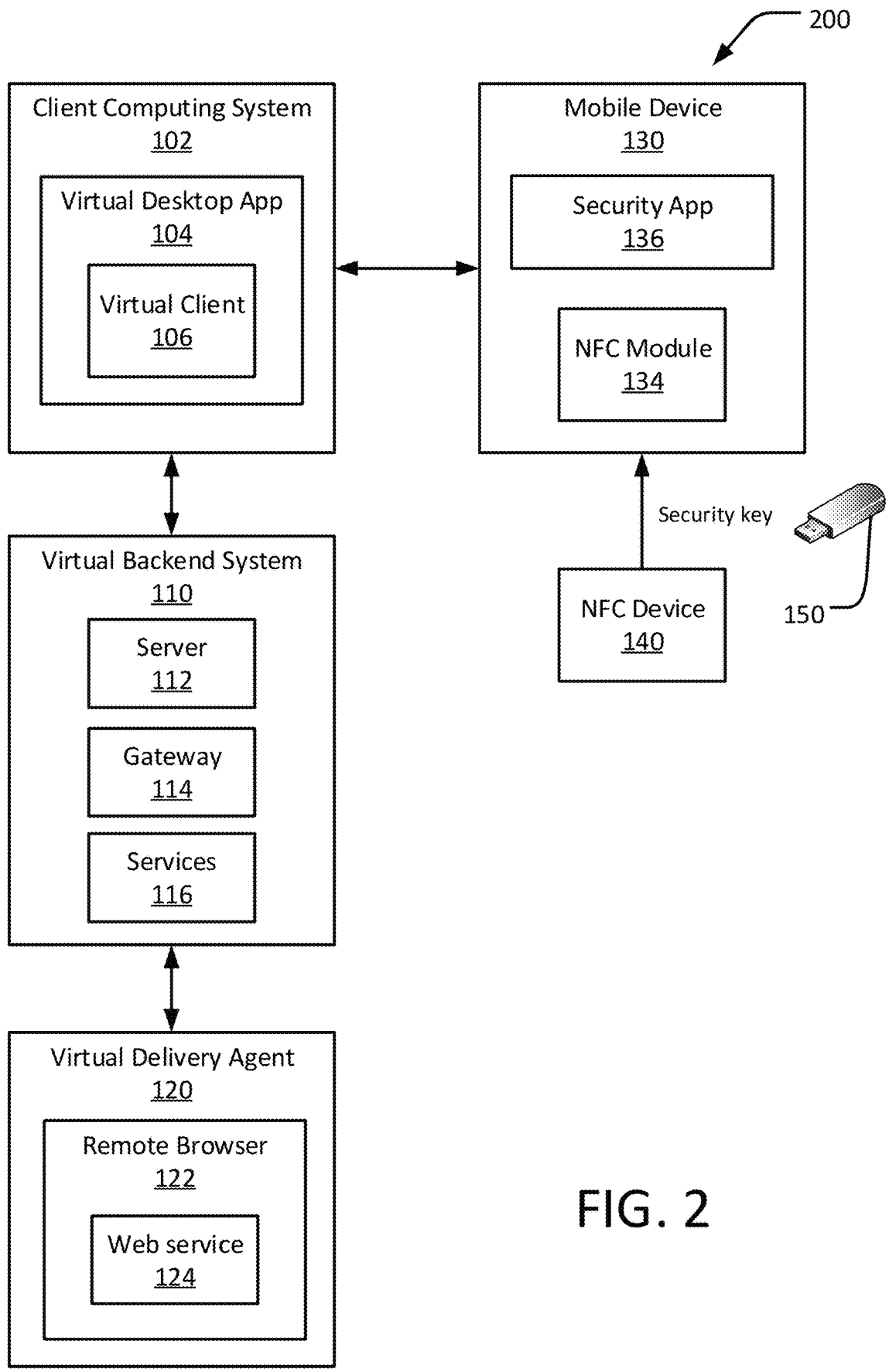
FIG. 2 is a block diagram of a system for contextual authentication using NFC, in accordance with another example of the present disclosure.

FIG. 2 is a block diagram of a system 200 for contextual authentication using NFC, in accordance with another example of the present disclosure. The system 200 is substantially similar to the system 100 of FIG. 1, except that the mobile device 130 and the client computing system 102 are configured for peer-to-peer communications that bypass or otherwise do not involve the virtual backend system 110. Such peer-to-peer communications can be conducted, for example, over wired connections (e.g., USB serial communications or ethernet) or wireless connections (e.g., Bluetooth® or WiFi®). For example, while in FIG. 1 the security key 150 can be sent to the client computing system 102 directly from the NFC device 140 (if the client computing system 102 is NFC-capable) or via the mobile device 130 and the virtual backend system 110 (if the client computing system 102 is not NFC-capable), in FIG. 2 the security key 150 can be sent to the client computing system 102 directly from the mobile device 130 via the peer-to-peer communications.

Contextual Authentication Process

Figure 3:
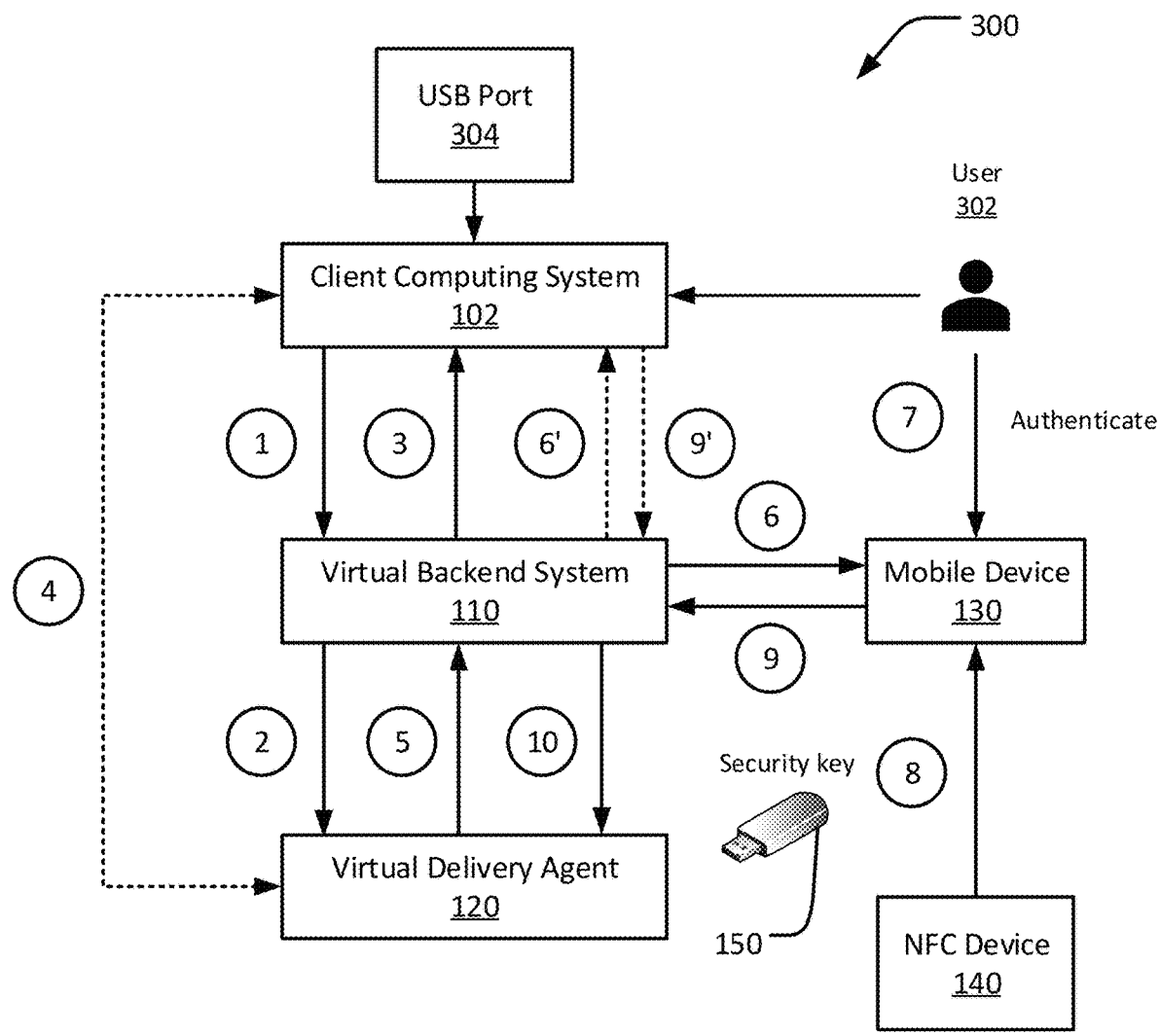
FIG. 3 is a flow diagram of a contextual authentication process using NFC, in accordance with an example of the present disclosure.

FIG. 3 is a flow diagram of a contextual authentication process using NFC, in accordance with an example of the present disclosure. In this example, at step 1, the virtual client 106 on the client computing system 102 requests launch of the web service 124 via the services 116 on the virtual backend system 110. For instance, the user is attempting to access, through the remote browser 122, a web email service that requires MFA for login. At step 2, the virtual backend system 110 launches the web service 124 on the remote browser 122. At step 3, the virtual backend system 110 sends connection information for the web service 124 to the client computing system 102, so that, at step 4, the virtual client 106 can establish a session with the web service 124.

Next, at step 5, the remote browser 122 detects a security event from the web service 124—such as a request for MFA—and requests the security key 150 from the services 116 on the virtual backend system 110. The services 116 evaluate the context of the client computing system 102 to determine how to obtain the security key 150. The context of the client computing system 102 can represent the capability of the system to receive the security key 150 via one of several mechanisms, such as a serial port (e.g., USB) or wirelessly (e.g., a NFC reader), and the availability of such mechanisms (e.g., whether they are present and, if so, whether they are in use by another device or available/unused). For example, if the client computing system 102 does not have an NFC reader and there is no available USB port 304, and if the user 302 has started the virtual desktop app 132 on the mobile device 130 and the mobile device 130 is in proximity of the client computing system 102, then the services 116 can determine that the security key 150 can be obtained from the NFC device 140 of the mobile device 130. If the services 116 determine that the security key 150 is to be obtained from the mobile device 130 (e.g., if the context of the client computing system 102 is that no USB port is available or unused), then, at step 6, the services 116 request the security key 150 from the mobile device 130. If, instead, the services 116 determine that the security key 150 can be obtained from a USB port 304 of the client computing system 102 (e.g., if the context of the client computing system 102 is that a USB port is available and a USB security key is present in the USB port), then, at step 6', the services 116 requests the security key 150 from the client computing system 102, and, at step 9', the client computing system 102 delivers the security key 150 from the USB port 304 to the services 116 in the virtual backend system 110.

When the virtual backend system 110 attempts to obtain the security key 150 from the NFC device 140, at step 7, the user 302 first provides valid credentials for accessing the security key 150. For example, the user may enter a password or use biometric authentication (e.g., fingerprint, facial scan, etc.) to unlock the mobile device 130 or to launch an authentication app for authorization to provide the security key 150. Once the user has provided valid credentials, at step 8, the virtual desktop app 132 on the mobile device 130 obtains the security key 150 from the NFC device 140 (e.g., an NFC security key in proximity of the NFC device 140) and, at step 9, the mobile device 130 delivers the security key 150 to the service 116 on the virtual backend system 110. Next, at step 10, the services 116 delivers the security key 150 to the web service 124 on the remote browser 122. Once the web service 124 receives the security key 150, the web service 124 permits the user to access the web service 124.

In some examples, if the client computing system 102 has an NFC reader and an USB port, and the security key 150 (e.g., Security key USB) is attached to the USB port, the services 116 determine whether the security key 150 in the USB port was previously associated with the web service 124. For example, different security keys 150 can be associated with different web services 124. An association can be created as follows. Initially, the remote browser 122 opens a website that triggers use of an MFA security key (e.g., YubiKey®). The user inserts the USB key into the USB port 304 and presses a key that generates, for example, 44 characters keystrokes within one second to be sent via a virtual channel to the remote browser 122 (e.g., via the virtual backend system 110). In some other examples, the number of character keystrokes can be any value. The keystrokes are detected by the remote browser 120 or the virtual desktop app 104 to identify the USB key being used. The virtual backend system 110 then maps the USB security key device details with the URL/domain of the web service 124 (such as URL/app). For example, the security key 150 is a USB device and has corresponding make/product/identifier details that uniquely identify the security key 150, and these details in conjunction with the URL/domain are used for the mapping. The mapping can be created within the web service 124 and updated in the virtual backend system 110 so as to be used again in the future. The mapping will be available to the client computing system 102 when connected to the virtual backend system 110. The virtual desktop app 104 on the client computing system 102 can detect which USB device(s) are inserted into the USB port 304 and compare those devices with the mapping to determine whether the USB device, based on the device details, has previously been used to authenticate the web service 124 corresponding to the URL/domain for the USB device. If there is a match, then the virtual desktop app 104 can leverage the already attached/inserted USB device to receive and apply the security key 150 when the web service 124 requests MFA. Otherwise, the user can be prompted to supply authentication via the NFC device 140, if present.

Figure 4:
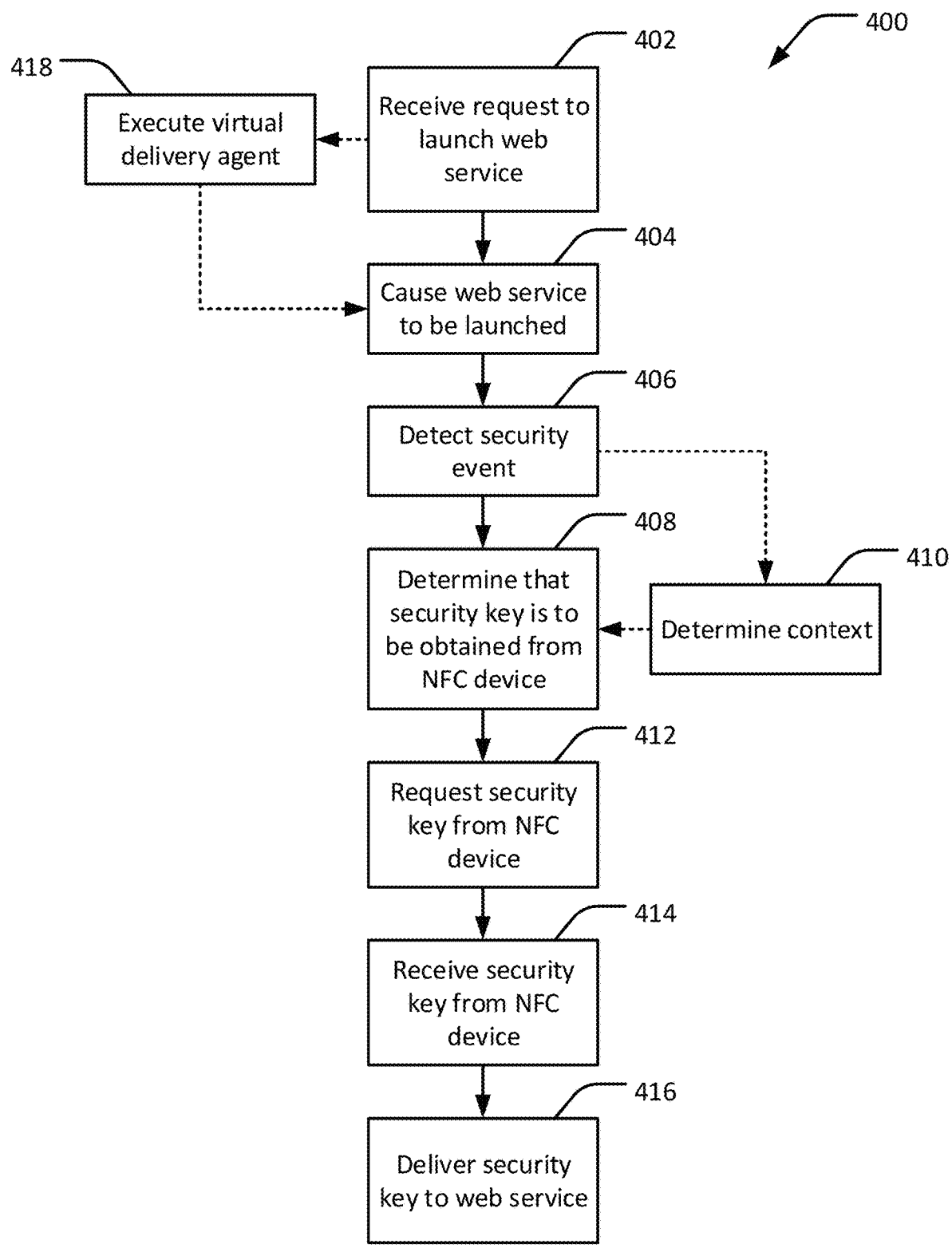
FIG. 4 is a flow diagram of a contextual authentication method for secure remote sessions, in accordance with an example of the present disclosure.

FIG. 4 is a flow diagram of a contextual authentication method 400 for secure remote sessions, in accordance with an example of the present disclosure. The method 400 can be implemented, for example, in the virtual backend system 110 of FIGS. 1 and 2. The method 400 includes receiving 402, by a processor and from a remote browser associated with a client computing system, a request to launch a web service. For example, the client computing system can be executing a virtual desktop app configured to host a virtual client. A virtual delivery agent can be configured to provide the web service to the virtual client via a remote browser. The method 400 further includes causing 404, by the processor, the web service to be launched on the remote browser. In some examples, a virtual backend system handles the tasks involved in launching the remote browser, as will be understood in light of this disclosure.

The method 400 further includes detecting 406, by the processor and from the web service, a security event. The security event can include, for example, a request from the web service for a security key or other authentication information. In response to detecting the security event, the method 400 further includes determining 408, by the processor, that a security key is to be obtained from a near-field communication (NFC) device brought into proximity of a mobile device based on a context of the client computing system (e.g., a notification can be sent to the user of the mobile device to bring the NFC capable key into proximity of the mobile device). In some examples, the mobile device includes an NFC module configured to receive the security key wirelessly from the NFC device. In some examples, the mobile device includes an NFC module configured to receive the security key from the NFC device.

In some examples, the method 400 includes determining 410 the context of the client computing system based on a proximity of the mobile device to the client computing system or based on an availability of at least one physical data port (e.g., a USB port). For example, the context of the client computing system can be a determination that a USB port is available and whether a USB security key is present in the USB port, or a determination that no USB port is available or unused. If, for example, the context includes a determination that the mobile device is in proximity to the client computing system, the method 400 further includes requesting 412, by the processor, the security key from the NFC device via the mobile device and receiving 414, by the processor, the security key from the NFC device via the mobile device. In some examples, the security key is received from the NFC device via a peer-to-peer connection between the client computing system and the mobile device. If, in another example, the context includes a determination that at least one physical data port is available, the method 400 further includes requesting the security key from the NFC device via the at least one physical data port and receiving the security key from the NFC device via the at least one physical data port. If, in some examples, no NFC device is present in the physical data port, the method 400 can include prompting the user to insert the NFC device into the physical data port. In some cases, NFC authentication on a mobile device may be given preference over USB authentication and can be set by user preference. This can help in situations where the USB key may be activated in the wrong app and thus send the key to the wrong app. Tapping the NFC when authentication is needed may help to address such issues.

The method 400 further includes delivering 416, by the processor, the security key to the web service via the remote browser. In some examples, the method 400 includes executing 418, by a processor of a remote machine, a virtual delivery agent that executes remotely from the client computing system, wherein the remote browser is configured to participate in a virtual session through the virtual delivery agent.

Example Computing Device

Figure 5:
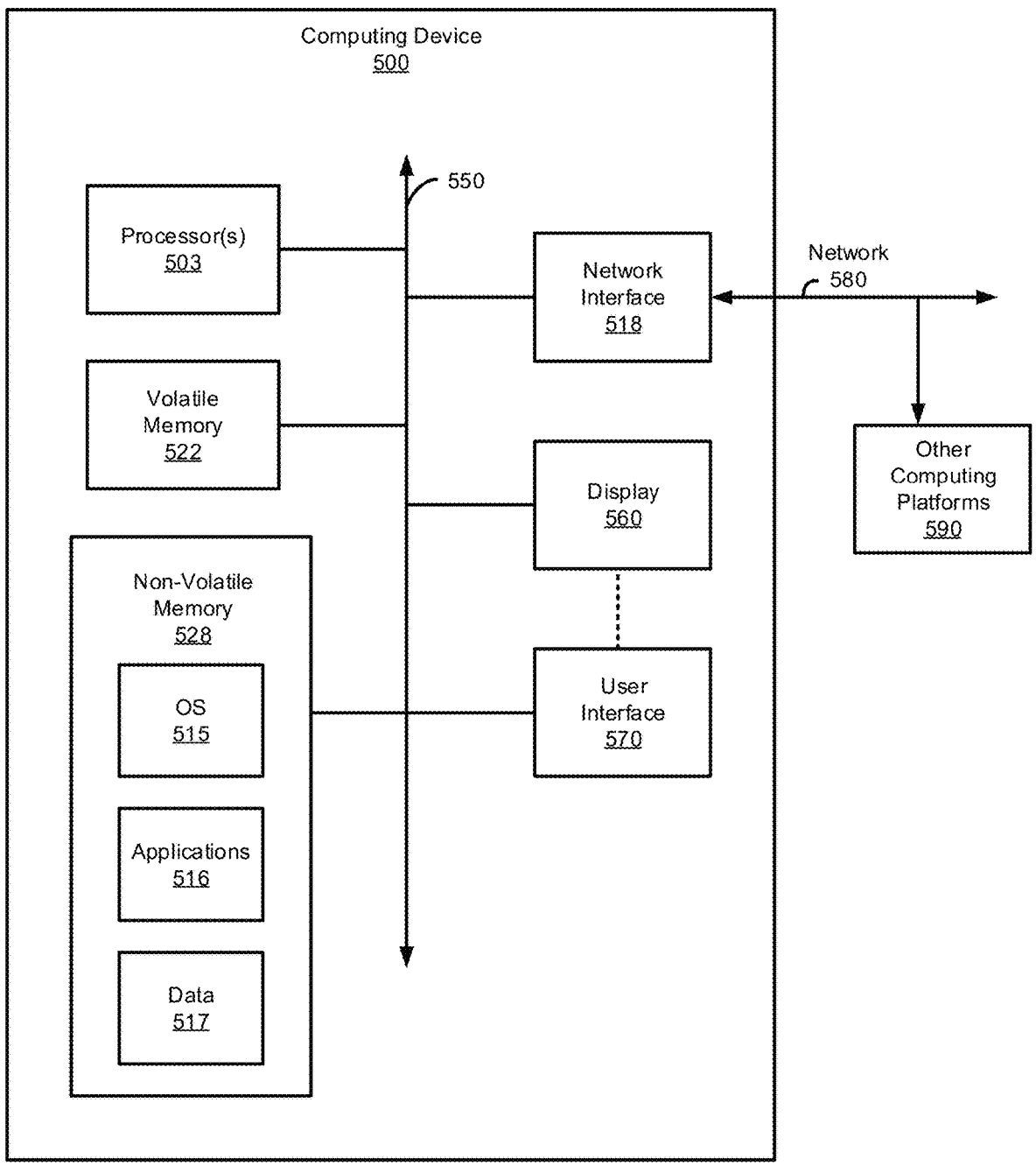
FIG. 5 is a block diagram of a computing device configured to implement various systems and processes in accordance with examples disclosed herein.

FIG. 5 is a block diagram of a computing device 500 configured to implement various systems and processes in accordance with examples disclosed herein. It will be understood that multiple computing devices 500 can be implemented according to the examples provided herein, where each of the computing devices 500 is configured to perform certain functions in conjunction with other computing devices 500. In some examples, the computing device 500 can include a workstation, a laptop computer, a tablet, a mobile device, or any suitable computing or communication device. One or more components of the computing device 500, including the client computing system 102, the virtual backend system 110, and/or the mobile device 130, can include or otherwise be executed using one or more processors 503, volatile memory (e.g., random access memory (RAM)) 522, non-volatile machine-readable mediums (e.g., a non-volatile memory 528), one or more network or communication interfaces 518, a user interface (UI) 570, a display 560, and a communications bus 550. The non-volatile (non-transitory) machine-readable mediums 528 can include: one or more hard disk drives (HDDs) or other magnetic or optical machine-readable storage media; one or more machine-readable solid state drives (SSDs), such as a flash drive or other solid-state storage media; one or more hybrid machine-readable magnetic and solid-state drives; and/or one or more virtual machine-readable storage volumes, such as a cloud storage, or a combination of such physical storage volumes and virtual storage volumes or arrays thereof. The user interface 570 can include one or more input/output (I/O) devices (e.g., a mouse, a keyboard, a touch screen/monitor/panel, a microphone, one or more speakers, etc.). The display 560 can provide a graphical user interface (GUI). The non-volatile memory 528 stores an operating system (OS), one or more applications, and data such that, for example, computer instructions of the operating system and the applications, are executed by processor (s) out of the volatile memory. In some examples, the volatile memory 522 can include one or more types of RAM and/or a cache memory that can offer a faster response time than a main memory. Data can be entered through the user interface 570. Various elements of the computing device 500 can communicate via the communications bus 550 or the network interface 518.

The computing device 500 can also be referred to as a client device, a computing device, an endpoint device, a computer, a computer system, or a server. The computing device 500 is shown as an example client computing system 102, virtual backend system 110, and/or mobile device 130, and can be implemented within any computing or processing environment with any type of physical or virtual machine or set of physical and virtual machines that can have suitable hardware and/or software capable of operating as described herein. In some examples, some components of the computing device can be implemented virtually (e.g., using a combination of hardware and software), such as to provide the virtual delivery agent 120 to the virtual desktop app 104 of the client computing system 102, where the virtual delivery agent 120 emulates certain processing functions of the client computing system 102 (e.g., including at least portions of the method 400 of FIG. 4) using hardware components of the client computing system 102 (e.g., processors, network communications hardware, I/O devices, etc.).

The non-volatile memory 528 stores an operating system (OS) 515, one or more applications or programs 516, and data 517. The OS 515 and the application 516 include sequences of instructions that are encoded for execution by processor(s) 503. Execution of these instructions results in manipulated data. Prior to their execution, the instructions can be copied to the volatile memory 522. In some examples, the volatile memory 522 can include one or more types of RAM and/or a cache memory that can offer a faster response time than a main memory. Data can be entered through the user interface 570 or received from the other I/O device(s), such as the network interface 518. The various elements of the computing device 500 described above can communicate with one another via the communications bus 550 and/or via the network interface 518 to other computing platforms 590.

The processor(s) 503 can be implemented by one or more programmable processors to execute one or more executable instructions, such as a computer program, to perform the functions of the system. As used herein, the term "processor" describes circuitry or hardware that performs a function, an operation, or a sequence of operations. The function, operation, or sequence of operations can be hard coded into the circuitry or a data storage device, or soft coded by way of instructions held in the storage device and executed by the circuitry. A processor can perform the function, operation, or sequence of operations using digital values and/or using analog signals. In some examples, the processor can include one or more application specific integrated circuits (ASICs), microprocessors, digital signal processors (DSPs), graphics processing units (GPUs), microcontrollers, field programmable gate arrays (FPGAs), programmable logic arrays (PLAs), multicore processors, or general-purpose computers with associated memory. The processor(s) 503 can be analog, digital, or a combination of these. In some examples, the processor(s) 503 can be one or more local physical processors or one or more remotely located physical processors. A processor including multiple processor cores and/or multiple processors can provide functionality for parallel, simultaneous execution of instructions or for parallel, simultaneous execution of one instruction on more than one piece of data.

The network interfaces 518 can include one or more interfaces to enable the computing device 500 to access a computer network 580 such as a Local Area Network (LAN), a Wide Area Network (WAN), a Personal Area Network (PAN), or the Internet through a variety of wired and/or wireless connections, including cellular connections and Bluetooth connections. In some examples, the network 580 may allow for communication with other computing devices 590, such as the client computing device 102, the virtual backend system 110, and/or the mobile device 130, to enable distributed, shared, or cooperative computing (e.g., such as cooperatively functioning to enable and provide enable MFA to one or more of the applications 516). The network 580 can include, for example, one or more private and/or public networks over which computing devices can exchange data.

In described examples, the computing device 500 can execute an application on behalf of a user of a client device. For example, the computing device 500 can execute one or more virtual machines managed by a hypervisor. Each virtual machine can provide an execution session within which applications execute on behalf of a user or a client device, such as a hosted desktop session. The computing device 500 can also execute a terminal services session to provide a hosted desktop environment. The computing device 500 can provide access to a remote computing environment including one or more applications, one or more desktop applications, and one or more desktop sessions in which one or more applications can execute.

The foregoing description and drawings of various embodiments are presented by way of example only. These examples are not intended to be exhaustive or to limit the present disclosure to the precise forms disclosed. Alterations, modifications, and variations will be apparent in light of this disclosure and are intended to be within the scope of the present disclosure as set forth in the claims. For example, the processes disclosed herein each represent a sequence of acts in a particular example. Some acts are optional and, as such, can be omitted in accord with one or more examples. Additionally, the order of acts can be altered, or other acts can be added, without departing from the scope of the apparatus and methods discussed herein.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

What is claimed is:

1. A method of contextual authentication for secure remote sessions, the method comprising:
   receiving, by a processor and from a remote browser associated with a client computing system, a request to launch a web service;
   causing, by the processor, the web service to be launched on the remote browser;
   detecting, by the processor and from the web service, a security event;
   in response to detecting the security event, determining, by the processor, that a security key is to be obtained from a near-field communication (NFC) device connected to a mobile device based on a context of the client computing system;
   requesting, by the processor, the security key from the NFC device via the mobile device;
   receiving, by the processor, the security key from the NFC device via the mobile device; and
   delivering, by the processor, the security key to the web service via the remote browser.

2. The method of claim 1, further comprising determining, by the processor, the context of the client computing system based on a proximity of the mobile device to the client computing system.

3. The method of claim 1, further comprising determining, by the processor, the context of the client computing system based on an availability of at least one physical data port.

4. The method of claim 1, further comprising executing, by a processor of a remote machine, a virtual delivery agent that executes remotely from the client computing system, wherein the remote browser is configured to participate in a virtual session through the virtual delivery agent.

5. The method of claim 1, wherein the security key is received from the NFC device via a peer-to-peer connection between the mobile device and the client computing system, or the security key is received from the mobile device by the remote browser via a virtual backend system.

6. The method of claim 1, wherein the mobile device includes an NFC module configured to receive the security key wirelessly from the NFC device.

7. The method of claim 1, wherein the mobile device includes an NFC module configured to receive the security key from the NFC device.

8. A computer program product including one or more non-transitory machine-readable mediums having instructions encoded thereon that when executed by at least one processor cause a process to be carried out, the process comprising:
   receiving, from a remote browser associated with a client computing system, a request to launch a web service;
   causing the web service to be launched on the remote browser;
   detecting, from the web service, a security event;
   in response to detecting the security event, determining that a security key is to be obtained from a near-field communication (NFC) device connected to a mobile device based on a context of the client computing system;
   requesting the security key from the NFC device via the mobile device;
   receiving the security key from the NFC device via the mobile device; and
   delivering the security key to the web service via the remote browser.

9. The computer program product of claim 8, wherein the process further comprises determining the context of the client computing system based on a proximity of the mobile device to the client computing system.

10. The computer program product of claim 8, wherein the process further comprises determining the context of the client computing system based on an availability of at least one physical data port.

11. The computer program product of claim 8, wherein the process further comprises executing, by a processor of a remote machine, a virtual delivery agent that executes remotely from the client computing system, wherein the remote browser is configured to participate in a virtual session through the virtual delivery agent.

12. The computer program product of claim 8, wherein the security key is received from the NFC device via a peer-to-peer connection between the mobile device and the client computing system, or the security key is received from the mobile device by the remote browser via a virtual backend system.

13. The computer program product of claim 8, wherein the mobile device includes an NFC module configured to receive the security key wirelessly from the NFC device.

14. The computer program product of claim 8, wherein the mobile device includes an NFC module configured to receive the security key from the NFC device.

15. A system comprising:
a storage; and
at least one processor operatively coupled to the storage, the at least one processor configured to execute instructions stored in the storage that when executed cause the at least one processor to carry out a process comprising
receiving, from a remote browser associated with a client computing system, a request to launch a web service;
causing the web service to be launched on the remote browser;
detecting, from the web service, a security event;
in response to detecting the security event, determining that a security key is to be obtained from a near-field communication (NFC) device connected to a mobile device based on a context of the client computing system;
requesting the security key from the NFC device via the mobile device;
receiving the security key from the NFC device via the mobile device; and
delivering the security key to the web service via the remote browser.

16. The system of claim 15, wherein the process further comprises determining the context of the client computing system based on a proximity of the mobile device to the client computing system, determining the context of the client computing system based on an availability of at least one physical data port, or both.

17. The system of claim 15, wherein the process further comprises executing, by a processor of a remote machine, a virtual delivery agent that executes remotely from the client computing system, wherein the remote browser is configured to participate in a virtual session through the virtual delivery agent.

18. The system of claim 15, wherein the security key is received from the NFC device via a peer-to-peer connection between the mobile device and the client computing system, or the security key is received from the mobile device by the remote browser via a virtual backend system.

19. The system of claim 15, wherein the mobile device includes an NFC module configured to receive the security key wirelessly from the NFC device.

20. The system of claim 15, wherein the mobile device includes an NFC module configured to receive the security key from the NFC device.

* * * * *